ated Feb. 1, 1972

3,639,533
TRIORTHOPHOSPHATE ESTERS OF TRIMETHYLOL PROPANE AND SALTS THEREOF
William G. De Pierri, Jr., Baytown, Tex., assignor to Esso Research and Engineering Company
No Drawing. Filed Apr. 4, 1968, Ser. No. 718,901
Int. Cl. C07f 9/02; C02b 5/06
U.S. Cl. 260—928  7 Claims

ABSTRACT OF THE DISCLOSURE

Triorthophosphate ester of trimethylol propane and the alkali metal and ammonium salts thereof.

---

The deposition of scale forming salts from an aqueous system containing a scale forming amount of a salt such as calcium carbonate, barium sulfate, strontium sulfate, strontium carbonate and magnesium carbonate is inhibited by adding to the system an effective amount of triorthophosphate ester of trimethylol propane and the alkali metal and ammonium salts thereof. The aqueous system is suitably a brine in a subsurface formation to which the inhibitor is added.

BACKGROUND OF THE INVENTION

(1) Field of the invention

The present invention is directed to the prevention of scale which deposits from an aqueous system. More particularly the invention is concerned with the inhibition of an aqueous system containing calcium carbonate, strontium carbonate, magnesium carbonate, barium sulfate and strontium sulfate, and other water insoluble salts. In its more specific aspects, the invention is concerned with the inhibition of the deposition of water insoluble salts in formations containing said salts.

(2) Description of the prior art

It has been known heretofore to use phosphorous compounds in inhibition of scale in aqueous systems. It has also been known to introduce into subsurface formations compounds of phosphorous to prevent deposition of water insoluble salts. However, the prior art has not been satisfactory in that either the salts would not remain in the subsurface formation when injected thereinto such as by failure of the salts to adsorb on the formation rock or the injected inhibitor would lose its effectiveness. The present invention specifically overcomes the limitations of the prior art.

The following specific U.S. patents were considered with respect to this invention. 2,128,161; 3,213,017; 3,258,071; 3,258,428; 3,271,306; 3,283,817; 3,288,217; 3,304,349; 3,308,161; 3,336,221.

SUMMARY OF THE INVENTION

The present invention may be briefly described and summarized as involving a new compound which is the triorthophosphate ester of trimethylol propane and the alkali metal and ammonium salts thereof. Specifically the present invention involves the following compound:

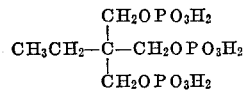

The alkali metal and ammonium salts of the phosphate ester of trimethylol propane are also part of this invention. The invention may also be briefly summarized as involving inhibition of the deposition of scale from an aqueous system such as a brine containing salts of calcium carbonate, calcium sulfate, barium sulfate, strontium sulfate, strontium carbonate and magnesium carbonate by adding the triorthophosphate ester of trimethylol propane and the alkali metal and ammonium salts thereof to the aqueous system which may be conveniently accomplished by introducing the particular compound under pressure into the subsurface formation.

DESCRIPTION OF THE PREFERRED MODE AND EMBODIMENT

In accordance with the present invention an inhibitor which is effective in preventing the precipitation of calcium carbonate, strontium carbonate, magnesium carbonate, barium sulfate and strontium sulfate from supersaturated solutions has been provided. In accordance with the present invention this inhibitor is prepared by the phosphorylation of trimethylol propane as outlined in the following equation:

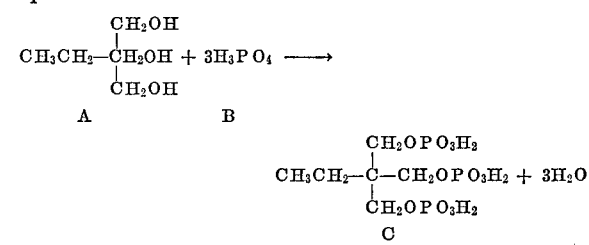

The inhibitor which is the triorthophosphate ester of trimethylol propane may suitably be used in the acid form or it may be neutralized, either paritally or completely, with a base such as sodium hydroxide, potassium hydroxide, ammonia, and the like and the salt thus formed used.

In order to illustrate the effectiveness of the present invention, the inhibitor of the present invention was added to a carbonated solution and the results of these several operations are shown in the following Table I which sets out the percent inhibition, the concentration and the analysis of the aqueous system containing calcium carbonate.

TABLE I

| | Inhibition with carbonate inhibitor (C) [1] | |
|---|---|---|
| | Concentration, p.p.m. | Percent inhibition [2] |
| 1 | Blank | 0 |
| 2 | 1.5 | 32 |
| 3 | 3 | 62 |
| 4 | 6 | 74 |
| 5 | 12 | 83 |

[1] The tests were run at 150° F. for 20 hrs.
[2] The inhibitors were tested in a solution containing 160 gm. NaCl, 3.0 g. CaCl$_2$, 1.32 g. MgCl$_2$.6H0$_2$, 2.0 g. NaHCO$_3$ in 2.1. H$_2$O.

The inhibitor is prepared in accordance with the foregoing equation. Thus, in a specific example 0.68 mole of trimethylol propane were mixed with 4.1 moles of 115% polyphosphoric acid; a rapid exothermic reaction resulted when stirring was started in which the temperature rose to 103° C. After the exothermic reaction ended after about 5 minutes, the reaction mixture was heated for about 1 hour with stirring at a temperature of 105°–112° C. The inhibitor of the present invention was recovered as a viscous brown liquid and was used in the concentrations and operations set out in Table I, supra.

Temperatures employed in preparing the inhibitor may range from about 60° C. to 120° C. It is preferred to use a molar excess of polyphosphoric acid in the practice of the present invention; thus, while about 3 moles of polyphosphoric acid may be used per mole of trimethylol propane, it is preferred to use about 6 moles. Thus, from about 3 to about 10 moles of polyphosphoric acid per mole of trimethylol propane may be used.

As another example of the present invention, the inhibitor prepared as described supra was used in a brine containing 5% by weight NaCl and 500 p.p.m. of barium sulfate. This was compared with an uninhibited solution where the uninhibited solution gave a precipitate of barium sulfate upon mixing while the solution containing 10 p.p.m. of inhibitor remained clear for over 2 hours.

In another operation where 3 p.p.m. of inhibitor was added to the same solution the precipitate began to form after about 30 minutes. Thus, it is contemplated in the present invention that depending on the particular salt in the aqueous system the inhibitor may be used in a concentration ranging from about 1 p.p.m. up to about 50 p.p.m.; for the barium sulfate and strontium sulfate supra the range may be from about 1 p.p.m. up to about 25 p.p.m.

It is indeed a surprise that such small amounts of inhibitor would be effective in preventing the deposition of the particular water insoluble salts.

The present invention is quite advantageous and useful and may be used in various aqueous systems such as oil wells, wells containing brine, salt water disposal systems, in water treating plants and the like where the system is not exposed to temperatures in excess of about 200° F.

The nature and objects of the present invention having been completely described and illustrated and the best mode and embodiment contemplated set forth what I wish to claim as new and useful and secure by Letters Patent is:

1.

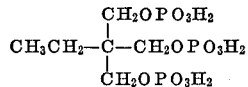

2. The alkali metal salts of the compound of claim 1.
3. The ammonium salts of the compound of claim 1.
4. An alkali metal salt in accordance with claim 1 which is partially neutralized.
5. An ammonium salt in accordance with claim 1 which is completely neutralized.
6. An alkali metal salt in accordance with claim 1 which is completely neutralized.
7. An ammonium salt in accordance with claim 1 which is partially neutralized.

References Cited

UNITED STATES PATENTS 2,583,549   1/1952   Daul et al. _____ 260—928

CHARLES B. PARKER, Primary Examiner

A. H. SUTTO, Assistant Examiner

U.S. Cl. X.R.

252—80, 175; 260—978